United States Patent
Tapley

(10) Patent No.: US 11,111,683 B1
(45) Date of Patent: Sep. 7, 2021

(54) WATER FILTRATION/RECYCLING APPARATUS AND METHOD

(71) Applicant: Harold Tapley, Manteca, CA (US)

(72) Inventor: Harold Tapley, Manteca, CA (US)

( * ) Notice: Subject to any disclaimer, the term of this patent is extended or adjusted under 35 U.S.C. 154(b) by 0 days.

(21) Appl. No.: 16/811,750

(22) Filed: Mar. 6, 2020

Related U.S. Application Data

(60) Provisional application No. 62/814,383, filed on Mar. 6, 2019.

(51) Int. Cl.
    *E04H 4/12*     (2006.01)
    *C02F 1/00*     (2006.01)
    *C02F 1/40*     (2006.01)
    *C02F 103/42*     (2006.01)

(52) U.S. Cl.
    CPC ........... *E04H 4/1218* (2013.01); *C02F 1/004* (2013.01); *C02F 1/40* (2013.01); *C02F 2103/42* (2013.01); *C02F 2201/005* (2013.01); *C02F 2301/046* (2013.01); *C02F 2303/16* (2013.01)

(58) Field of Classification Search
    CPC .......... E04H 4/1218; C02F 1/40; C02F 1/004; C02F 2103/42; C02F 2301/046; C02F 2201/005; C02F 2303/16
    USPC .......... 210/167.14, 143, 614, 275, 277, 278, 210/791, 792, 793
    See application file for complete search history.

(56) References Cited

U.S. PATENT DOCUMENTS

| | | | | |
|---|---|---|---|---|
| 3,792,773 A | * | 2/1974 | Ross | B01D 21/30 210/712 |
| 4,028,241 A | * | 6/1977 | Davis | B01J 49/75 210/712 |
| 4,082,664 A | * | 4/1978 | Lindstol | B01D 24/004 210/793 |
| 4,202,768 A | * | 5/1980 | De Longe | B01D 37/00 210/205 |
| 5,350,505 A | * | 9/1994 | Tang | B01D 24/12 210/108 |
| 5,505,844 A | * | 4/1996 | Porter | B01D 24/10 210/95 |
| 9,539,529 B2 | | 1/2017 | Mullis | |
| 2004/0168529 A1 | * | 9/2004 | Carlson | G01N 33/15 73/866 |
| 2005/0269254 A1 | * | 12/2005 | Roitman | B01D 5/0081 210/252 |

(Continued)

FOREIGN PATENT DOCUMENTS

FR     3002221      *     8/2014

*Primary Examiner* — Fred Prince

(74) *Attorney, Agent, or Firm* — O'Banion & Ritchey LLP; John P. O'Banion

(57) ABSTRACT

A water recycling apparatus and method for a pool filtration system. A holding tank receives backwashed water containing water-borne particles, and is configured to allow for settling of particles into regions of clear water, and lower regions of sediment. Performing a backwash of the filter directs the backwash into the holding tank for settling for at least 24 hours. A recycling outlet in the tank is coupled through the pool filtration system and its valves to allow redirecting this filtered (or recycled/refiltered) water back to the pool, or for other uses, so that it is not directed down a drain, or otherwise wasted. In addition, the liquid portion of the sedimentary regions can be recycled as desired, such as to garden beds, and the lower sedimentary solids disposed of through a sewer connection or manually collected for disposal.

21 Claims, 8 Drawing Sheets

(56) References Cited

U.S. PATENT DOCUMENTS

2020/0299636 A1* 9/2020 Hazlebeck ............... C12N 1/12

* cited by examiner

WATER FILTRATION/RECYCLING APPARATUS AND METHOD

CROSS-REFERENCE TO RELATED APPLICATIONS

This application claims priority to, and the benefit of, U.S. provisional patent application Ser. No. 62/814,383 filed on Mar. 6, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to filtration of recreational pools, and more particularly to a water filtration apparatus and method which provides for recycling of filter backwash water.

2. Background Discussion

The advent of drier climatic conditions caused by lower average rainfalls and higher average temperatures has emphasized the need for devices, methods and strategies for conserving water resources across all categories of society, including domestic, agricultural, industrial, and commercial.

Water filtration systems, by their very nature, accumulate filtered material; such as water-borne Solids, vegetation, insects, hair, and the like. To clean the filter medium, one can remove the medium from the filter body for cleaning and replacement, or the filtration mechanism may be reversed by backwashing water through the filter against the prevailing or normal direction of water flow (known as "backwashing") to dislodge the filtered material. The water-borne filtered material is generally disposed of as waste water or storm water, such as through storm drains, storm sewers, or similar liquid waste conduits. In a standard sized sand filter used for a domestic pool, a typical backwash volume of water is about 396 gallons per backwash cycle that with normal conditions would be applied every 1-2 weeks. This represents per user, a substantial waste of over 15,000 gallons of clean pool water per year. The accumulative waste of useable, if not potable, water on a community scale represents a massive loss of precious water resources, particularly if one considers the enormous volumes of water used to backwash community pools, domestic pools and spas and commercial and industrial cooling plants. In addition, municipalities are increasingly moving toward assuring containment of chemicals and salts according to best management practices, and thus it is important to reduce the volume of these materials.

Accordingly, a need exists for a practical means for reducing water losses from pool filter backwashing, while improving containment of chemical and salt. The present disclosure fulfills that need and provides additional benefits over previous technologies.

BRIEF SUMMARY

This disclosure describes a water recycling apparatus and method, that by way of example, and not of limitation, may be used in combination with a swimming pool filter and pump.

In a generalized embodiment, the technology comprises a water recycling (settling or holding) tank which interoperates with the valves, pump and media based filter to provide a means for recycling a portion of the water utilized in the backwashing (backflushing) operation of the filter.

In at least one embodiment, the pump has an electrical motor (e.g., A/C motor) such as with a variable frequency drive or adjustable frequency drive for controlling motor speed to provide the user with gallon-per-minute (GPM) control and optimization of energy consumption.

In at least one embodiment, an activated filter media (AFM) is used instead of sand for 100% particulate release, shorter backwash cycles, providing an upcycled, sustainable, negatively charged media.

In at least one embodiment the water recycling tank is configured as follows: (a) the tank is in fluidic communication with the filter and the pump; (b) there is a substantial height difference between the upper internal space and the lower internal space of the tank, whereby the tank is adapted to permit water-borne sediments to settle near the base of the tank over time; (c) the tank has a waste outlet near or on its base; (d) the tank has a recycling outlet above the waste outlet that is in communication with the pump; and (e) the tank has an inlet above the recycling outlet that is in communication with the filter.

In one embodiment, the aforementioned tank is a component of an automated water recycling system comprising the aforementioned tank, an automated series of valves, and a programmable controller/timer.

In one embodiment the sand used in the filter is replaced with, an alternative material (AFM) that requires no replacement and provides a negative charge for 100% release during the backwash.

In one embodiment the aforementioned tank is used for recycling water in a method comprising one or more of the following steps: (a) directing water from a reservoir (pool) through the filter to perform a backwash; (b) directing the backwashed water from the filter through a recycling inlet line to the tank; (c) allowing water-borne sediments to settle on or near the base of the tank; (d) directing water above the settled sediment from the tank through a recycling outlet line to the reservoir; and (e) periodically exhausting the sediment-laden water near the base through a waste outlet, or draining water out to a sewer and collecting the sedimentary (sludge) material manually, such as with a wet-vacuum, for disposing in a trash receptacle.

In at least one embodiment the filter and settling tank are configured for being stacked and interconnected to provide additional benefits.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

1. Definitions

When used herein, the terms set forth below will be readily understood by those having ordinary skill in the art to have the meanings provided.

"Communication"—the term "communication" in the context of a water pipe linking the tank, filter, pump, or reservoir, includes a pipe either connected directly or having an in-line valve intermediate the aforementioned device or installation.

"Reservoir"—the term "reservoir" as used herein refers to any water storage facility, tank or vessel subject to filtration and from which backwash water is drawn to periodically clean a filter. Examples of a reservoir include domestic and municipal pools, spas, cooling towers and drinking water storage facilities.

"Phase Boundary"—the term "phase boundary" as used herein refers to a region or layer of water between different regions within the same body of water that separates a relatively clear region of water from a region of water bearing a relatively high concentration of water-borne sediments, debris and the like, typically near the base of the settling tank.

"Substantial Height Difference"—the phrase "substantial height difference" as used herein means the space within the holding tank that each "Zone" is in, in relative position to each other.

"Substantially Cylindrical"—the term "substantially cylindrical" as used herein means the basic shape of the hold tank but not limited to completely cylindrical to function properly, and including other shapes such as round and elongated, rounded corner closed polygons and combinations thereof.

2. Description of Embodiments

By way of example, and not of limitation, embodiments of the technology will be described with reference to the drawings for illustrative purposes.

Figure 1:
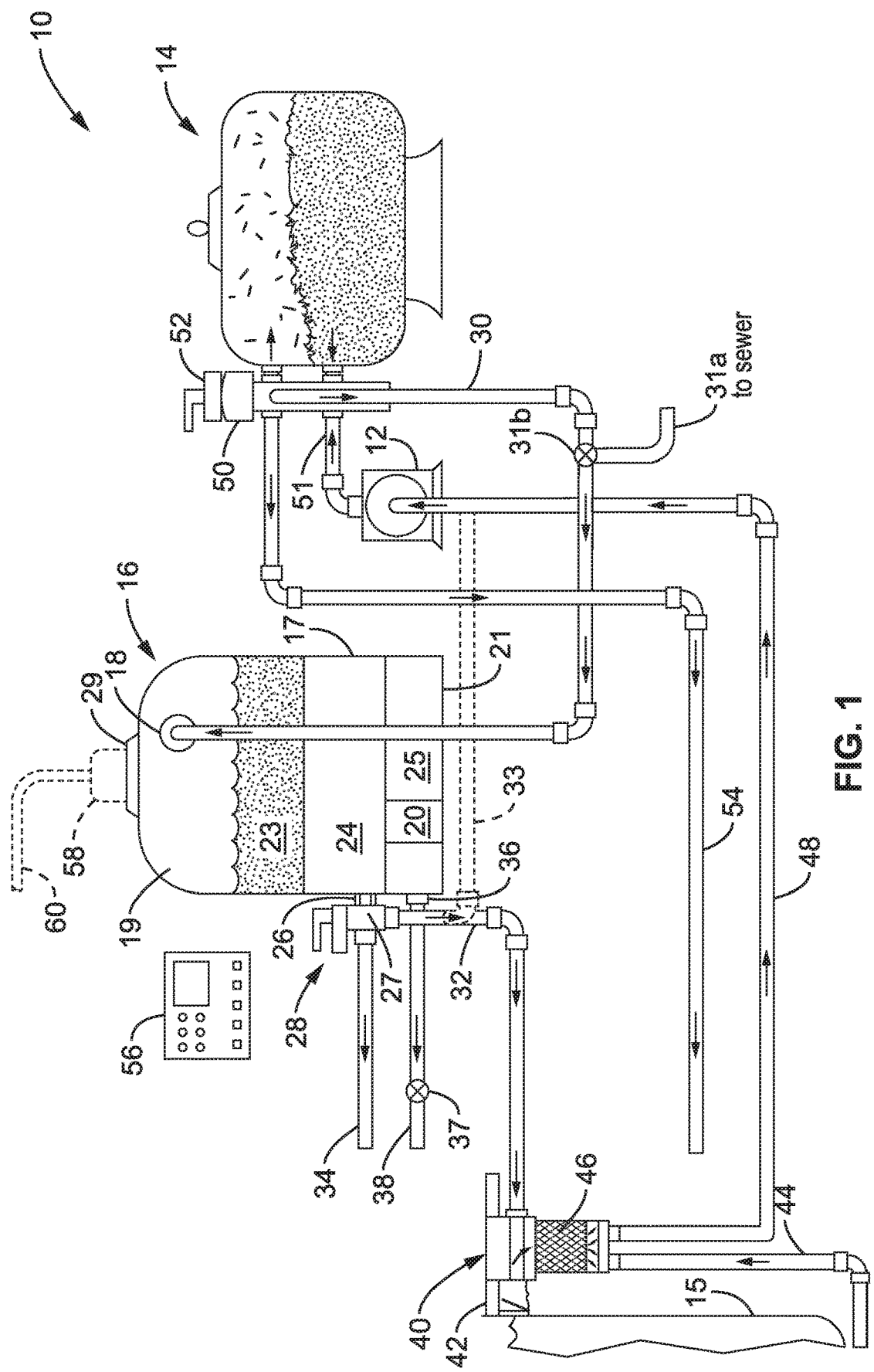
FIG. 1 is a schematic diagram of a backwash pool water recycling system according to at least one embodiment of the present disclosure.

FIG. 1 illustrates a first example embodiment 10 of a pool filter water recycling arrangement comprising a pump 12 (e.g., preferably a variable frequency drive (VFD) pump), filter 14, and a holding (settling) tank 16, which are configured for connection to a pool or other reservoir 15 to be filtered. A typical domestic pool, for example has a capacity of between 12,500 and 15,000 gallons. It will be appreciated that a VFD pump is a type of motor controller that drives an electric motor by varying the frequency and voltage supplied to the electric motor, and is also often referred to as variable speed drive, adjustable speed drive, adjustable frequency drive, AC drive, microdrive, and inverter pump. Filter 14 is preferably configured with activated filter material (AFM), or other high efficiency ecologically-friendly filter media.

Reservoir (pool) 15 is connected by one or more connections, such as skimmer 40 with basket 46 and skimmer flap 42, which connects to one or more lines 48 through pump 12 and into filter 14. Skimmer 40 is shown which draws water passing skimmer flap 42 and/or water from reservoir floor inlets (not shown) which is drawn into intake line 48 directed pump 12. Pump 12 is coupled by line 51 to the filter 14 through a valve 50, for example a multi-way valve, which is preferably automatic with an actuator 52. One line 54 from multi-way valve 50 provides a filtered water return to reservoir 15. Another line is a backwash line 30 to connecting to inlet 18 of holding (settling) tank 16. Valve 50 controls whether the flow is directed for normal flow or backwash operations.

Holding (settling) tank 16 is provided in any suitable form and may be fabricated from a range of suitable materials. For example, the holding tank 16 may be a standard cylindrical shape or may be shaped to better conform to its surroundings, particularly where space is at a premium. For example, the holding tank 16 may be shaped to fit along a building wall profiled to minimize interruption to pedestrian traffic or other uses of the surrounding space. The holding tank 16 may be made from standard tank-forming materials, such as galvanized metal, stainless steel, or more preferably from a plastic material such as polycarbonate, polyethylene, polypropylene and the like. In at least one preferred embodiment the interior of the tank and all fittings contacting the water are plastic as pool salt and chemicals will corrode components which are made from most metals, such as for example brass. The holding tank 16 is preferably roto-molded to enable the shaping of the holding tank 16 to suit restricted or unusually shaped spaces. However, the holding tank 16 may be molded by other means, such as blow-molding. A vented cap 29 is shown for venting and accessing the interior of holding tank 16. Preferably, holding tank 16 is formed with a translucent body and/or with one or more transparent windows 20, allowing for a visual check of the tank interior and/or contents, in particular the sediment zone.

In at least one embodiment, holding tank 16 comprises a rotary molded polypropylene hollow cylindrical body including the transparent viewing window 20 (for example, made of Perspex™), such as in one of its vertical walls. Alternatively, the viewing window may be in the form of a sight tube spaced from the vertical wall, or be made of a semi-transparent material. This would permit an operator to assess the water level with a quick glance. The holding tank 16 may be provided without a sight tube or glass, where algal growth may present a problem, or a cover may be provided over the sight tube or glass to prevent light entering the tank. It should be noted that where light is able to penetrate into the internal space of the tank, undesirable algal growth may be stimulated. However, where clean water is to be frequently released from holding tank 16 or the water treated to prevent algal growth, a sight tube may be desirable to enable easy assessment of the water level in the tank.

The holding tank 16 is shown exemplified with a vented cap 29 so that chemical vapors are not trapped, while still limiting evaporative loss and reducing the possibility of contamination from insects, ingress of decomposing vegetation, and so forth. The cap 29 may be removable to allow inspections, repairs and maintenance operations to be performed internally on holding tank 16.

The capacity of holding tank 16 is generally is relation to the capacity of the reservoir 15 and the volume of filter 14, the following being provided by way of example and not limitation. The reservoir 15 is shown in the drawings exemplified as a pool, but may be any reservoir of water utilizing a filter system having backwash capability. Where the pool is a typical domestic pool containing 15,000 gallons of water for example, the arrangement will require a settling (holding) tank 16 having a minimum capacity of about 60 to 100 gallons. Advantageously, the holding tank 16 is preferably vertically elongated to give water-borne solid materials sufficient distance along a substantial vertical length to settle under the influence of gravity over time.

This settling process has the affect of achieving a separation of clean, reusable water comprising the 80% to 90% uppermost portion of the water in the holding tank 16 on completion of the settlement process. The remaining lower most 10% to 20% portion of the contents at the base 17 of the holding tank 16 may be composed of sediment and slime associated with the disposable product of water filtered by the arrangement. If left unaided, water-borne solid particles will tend to settle by the influence of gravity at the base 17 of the body of water in the holding tank 16 in order to achieve distinct clean water 23 and colloidal 24 or sedimentary 25 phases over a minimum period of about 24 hours, or generally no more than three days. Even very fine particles of silt will tend to migrate to the lower portion 17 of the tank despite the presence of micro currents and movement occasioned by temperature variations across the length of the holding tank 16 and bumps and vibrations that holding tank 16 may be exposed to, depending on its location.

The clear liquid 23 will be recycled in one or more ways as described in later sections. The liquid in the remaining sediment zone 25 may be passively or actively drained from the holding tank through a tank discharge outlet 36 when valve 37 is open into waste pipe 38 whereby it can be delivered into the garden for recycled horticultural use or disposed of. Alternatively, the liquid in the sedimentary layer may be disposed of in a sewage line, and the solid sedimentary waste may be collected, such as manually using a mechanical vacuum, and disposed of in the trash, to properly contain chemicals and salts according to best management practices. In a typical domestic pool, the sediment zone would be evacuated/drained or cleaned periodically, or performed as infrequently as every 1-5 years. The sediment/water zone 25 of the holding tank 16 can be discharged through the waste outlet 36 via valve 37 into sediment line 38.

The tank backwash inlet 18 may be positioned upper most in or through the wall of holding tank 16 and most preferably in or through the roof or lid 29 of holding tank 16, as shown in FIG. 1, to minimize pressure resistance that might otherwise lead to back-flow pressure in the backwash discharge line or filter-tank line 30, joining filter 14 to holding tank 16. The lower the capacity of the pump 12 to force water against pressure, the higher up should the tank backwash inlet 18 be placed in the wall of holding tank 16. The reason for this is that as holding tank 16 fills with backwash water, the water pressure in the lower regions of holding tank 16 increases, and further water must be pressurized to be forced into holding tank 16 once the water rises above tank discharge outlet 26. The tank backwash inlet 18 may be positioned through the wall of an upper portion of holding tank 16, or alternatively through the roof or lid 28 of holding tank 16 (shown in FIG. 8), to minimize the possibility of back-flow pressure.

In at least one embodiment, backwash line 30 is coupled into inlet 18 which connects back to a multi-way backwash valve 50, through which backwash water is pumped into settling tank 16. This backwash valve, which is preferably at least a three way valve, (e.g., PVC (polyvinylchloride)) selects between normal filtering and backwash operations. The backwash valve 50 also has two connections to the sand/AFM filter 14, and a filter-pool return line 54.

It should also be noted that sewer connection line 31*a* with control valve 31*b* allows the backwash water to be selectively directed to a sewer.

When pump 12 is operating it draws water through pool suction line 48 which is directed by line 51 to valve 50 through one of the ports of filter 14, whose output is also directed through valve 50 to either line 30 to holding tank 16 during backwashing, or to filtered water return 54 during normal filtering operations.

It will be noted that filter-pool return line 54 is selectively opened and closed by the operation of backwash valve 50. Similarly, the direction of flow to and from the filter-tank is governed by the same backwash valve 50, which by way of example and not limitation, can comprise a multi-port manual valve or can include a valve actuator 52 allowing an automation control center 56 to control the operation of valve 50 as well as valve 27 and its actuator 28. Control center 56 would typically incorporate a simple computer processor as is typically utilized for controlling the operation of modern filtering systems, such as for swimming pools.

In normal filter operations fluid flow through filter 14 is in a first inlet-to-outlet direction, yet when performing a backwash operation, fluid flow is reversed to a second inlet-to-output direction. The filter depicted is exemplified as a standard filter containing a media, such as sand or activated media, such as AFM, in which the surface is negatively charged or otherwise activated to increase filtering efficiency. It should also be appreciated that other suitable filter types and media known in the art which can support a backwashing operation can be utilized with the present disclosure. For example, activated carbon or charcoal filters, as well as various synthetic or Recycled/Upcycled filter media can also be cleaned by utilizing a backwashing process.

Retained in the lower portion 17 of holding tank 16 the backwashed water will contain a certain amount of sediment. After settling, this will be found in a lowermost sediment zone 25 in the 10% to 20% lowermost portion of holding tank 16. The sediment port (waste outlet) 38 is located in the sediment zone 25 in the base of the holding tank. The interior of tank bottom 21 is preferably shaped, such as marginally internally concave with waste outlet 38 preferably located central to the base, to most effectively periodically drain the sediment zone through the waste outlet or through the tank cap as will be described in detail below.

Figure 8:
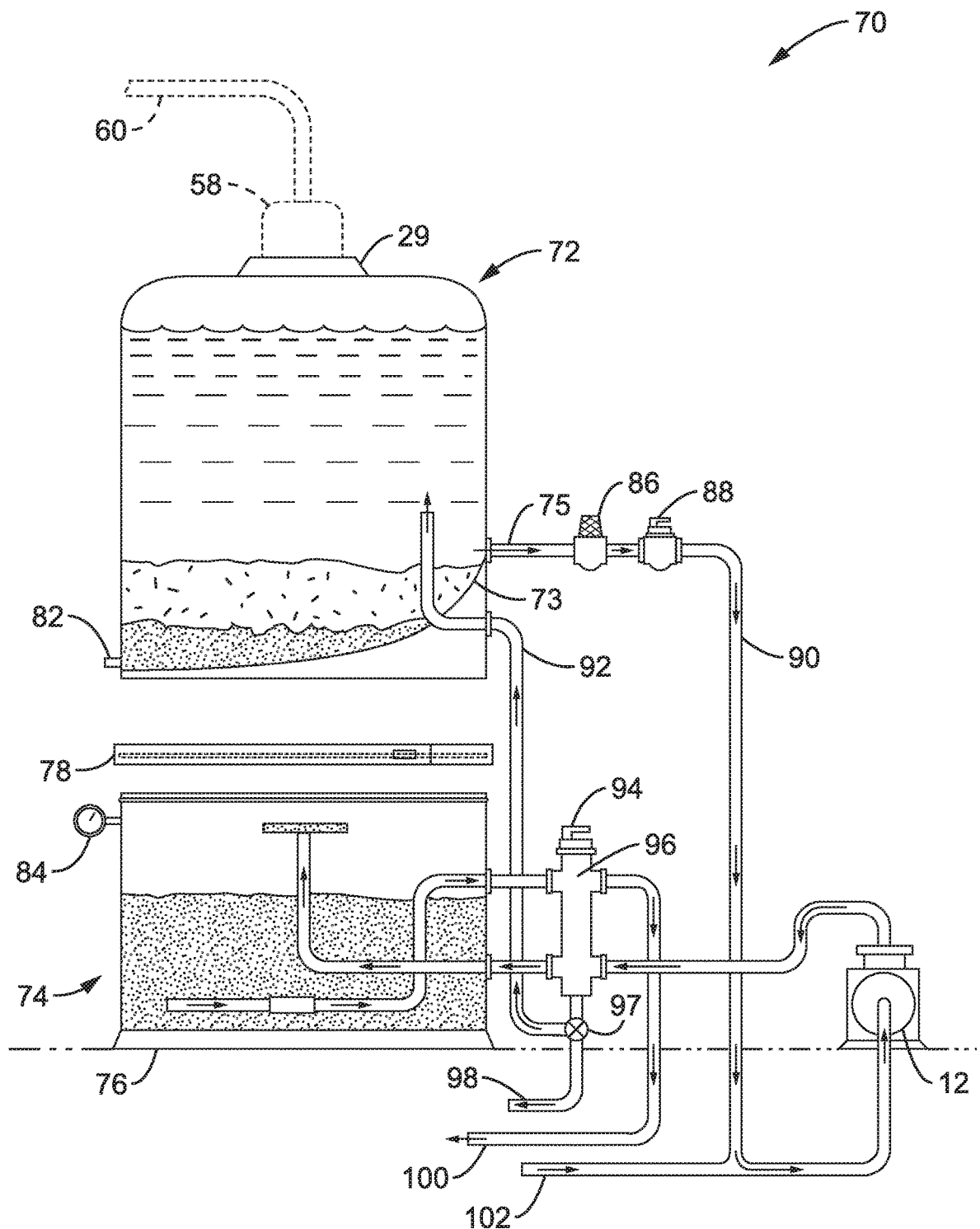
FIG. 8 is a schematic diagram of a backwash pool water recycling system utilizing a configuration with the filter and settling tank stacked and coupled together according to at least one embodiment of the present disclosure.

The backwash discharge line 30 terminates at inlet 18 in holding tank 16. The backwash discharge line extends through an uppermost portion of the vertical wall, or through the top (roof) of the tank (as seen in FIG. 8) through a water-tight seal such as an annular seal where the cylindrical pipe is used for the backwash discharge line. It should be appreciated, however, that for practical purposes, the backwash (recycling) inlet 18 may be positioned anywhere intermediate the vertical length of the vertical wall as pump 12 will provide sufficient positive pressure to ensure that backwash water can be forced into the holding tank under pressure sufficient to fill the holding tank to its capacity. It will be noted that use of a check valve (not shown) can prevent unwanted backflow.

In FIG. 1, the water level of holding tank 16 shown at the top of regions 23 and 24 represent the high water level achieved when the tank is at a normal operating level, while the low water level at the top of the sediment zone 25 represents the low water level achieved after the upper portion of water in holding tank 16 is recycled through outlet port 26 at the end of a settling period generally of 24 hours (minimum) through clear water return line 32. It will be noted that the low water level is above the phase boundary whereby only substantially clean water from the clean water phase is recovered from the holding tank for reuse.

Holding tank 16 has a tank discharge line (recycled water return line) depicted as recycling outlet 26 that is preferably positioned just above the phase boundary of the sediment/water zone 25 near the bottom 21 of holding tank 16. This position of the recycling discharge line is configured to ensure that, at the completion of the settling process, the water drawn through the tank discharge outlet 26 is substantially clean water to be reused.

The present disclosure beneficially provides multiple means for recycling this water. The water may be directly recycled through line 32 into the pool, such as into skimmer 40. It will be noted that when the pump is active, this water will also be drawn through suction line 48 to filter the water and direct it back to the pool through water return line 54. Alternatively, the recycled water can be directed through optional line 33 to pump 12 in which the water is filtered and directed back to water return line 54. Still further the recycled water can be directed by valve 27 into reuse port 34, for use in watering a garden, or for other uses.

Multi-way valve 27 with manual/automatic control 28 is coupled to recycling outlet 26. The valve can be closed, or set to connect outlet 26 to line 32 which returns the water to the pool 15 through pump 12 and filter 14, or set to connect outlet 26 to a line 34 for other water uses. This clear water line can also be connected in other ways for returning the recycled water to the reservoir (pool) 15, as is described in other embodiments of the present disclosure.

Thus, it has been shown that the present disclosure, aside from just allowing the recycled water to be returned to the pool, also allows the recycled clear water to be directed via reuse port 26 into reuse line 34, and out to a yard or other area, or a water storage system, for reusing the water as desired.

In at least one embodiment the system is configured for processing water from a rain catchment system. It will be noted that when it rains, an outdoor pool is already collecting water on its surface, so there would be little need to bring in additional water to the pool, since after reaching the full water mark additional water received would just pass into the pool overflow as wastewater. In this instance returning the water to the pool would provide no benefit.

The system of the present disclosure provides a recycled water outlet 34 and an associated control valve 27, as well as a vent cap configured for connecting a rainwater catchment input. The processed water can be directed for other purposes, for example water from outlet 34 can be directed into a garden or to a non-potable water storage system.

Thus, at least one embodiment of this system provides interoperation with an optional rainwater inlet 60, which preferably includes a rainwater filter/diverter 58. The inlet or filter/diverter unit is preferably configured to connect into or replace cover vent 29; thus allowing rain catchment to be an additional function of the system.

Accordingly, at least one embodiment of the present system can accept desired amounts of rainwater from a rain catchment system through pipe 60. In some cases the water may have already been sufficiently coarsely filtered and need only enter into a vented valve diverter device at the vent cap region of the settling tank. Otherwise, the diverter device may contain a filter, which can be an in-line filter or a diversionary filter, to prevent non-particulate solid materials from reaching the settling tank.

In the settling tank the particles in the rainwater can settle out, before the clear portion of the water is removed for other use. In addition, the valve device is configured to limit the amount of water entering the settling tank, and can close the valve in diverter 58 so that the unwanted rainwater is stopped from entering. In this figure it is assumed that another end of pipe 60 is configured to direct excessive rainwater into a storm drain system. After a period of settling, the clear water from the settling tank can be directed via reuse port 26 and through line 34. It will be noted that line 34 can be coupled to a water storage system, or reservoir, of any desired size, or otherwise used as desired.

In an automated system, the amount of rainwater coming in can be sensed, or the level of water in the settling tank sensed, so the unit determines when to close the rainwater input, and allow for a settling time before automatically discharging this water through outlet 34 for other uses. Accordingly, the system can further process rain water in batches and send it for storage.

Returning now to the primary functions of the system, it will be noted that there is a sediment port 36 preferably located at or near the bottom 21 of tank 16 and below the upper surface of the phase boundary between the sedimentary phase (zone) 25 and the clean water phase 23. The arrangement includes a tank waste line 38 with control valve 37 that by way of example and not limitation is adapted to deliver the sediment water phase 25, either to garden beds for recycled use or the liquid portion directed to a sewer drain and the solid sediments collected for disposal.

With regard to using the waste water for purposes such as watering a garden, it is noted that chemicals used in the treatment of water in the holding tank 16, for example, where the reservoir 15 is a pool, will generally dissipate by evaporation or chemical breakdown over a period of 24 hours or a maximum of two to three days. In such cases, it is believed that there are no more than trace amounts of such chemicals in the sediment-containing water 24 at the completion of a settling period. For example, chlorine gas will generally be given off into the atmosphere and salt in solution will remain in generally low and non-harmful concentrations. In any case, care may be taken to deliver such waste water only to selected plant types that are known to be salt resistant or tolerant.

By the above-described method, through each 24 hour cycle, between 80 to 90% of backwash water can be recycled by returning it through the filter to the reservoir and the remaining 10% to 20% of sediment phase water 25% can potentially be reused, for example, on plants and gardens. Accordingly, the amount of replacement water required to top-up the reservoir over time can be substantially reduced leading to substantial savings in water use.

The different operations of the present disclosure will now be described with greater particularity.

Figure 2:
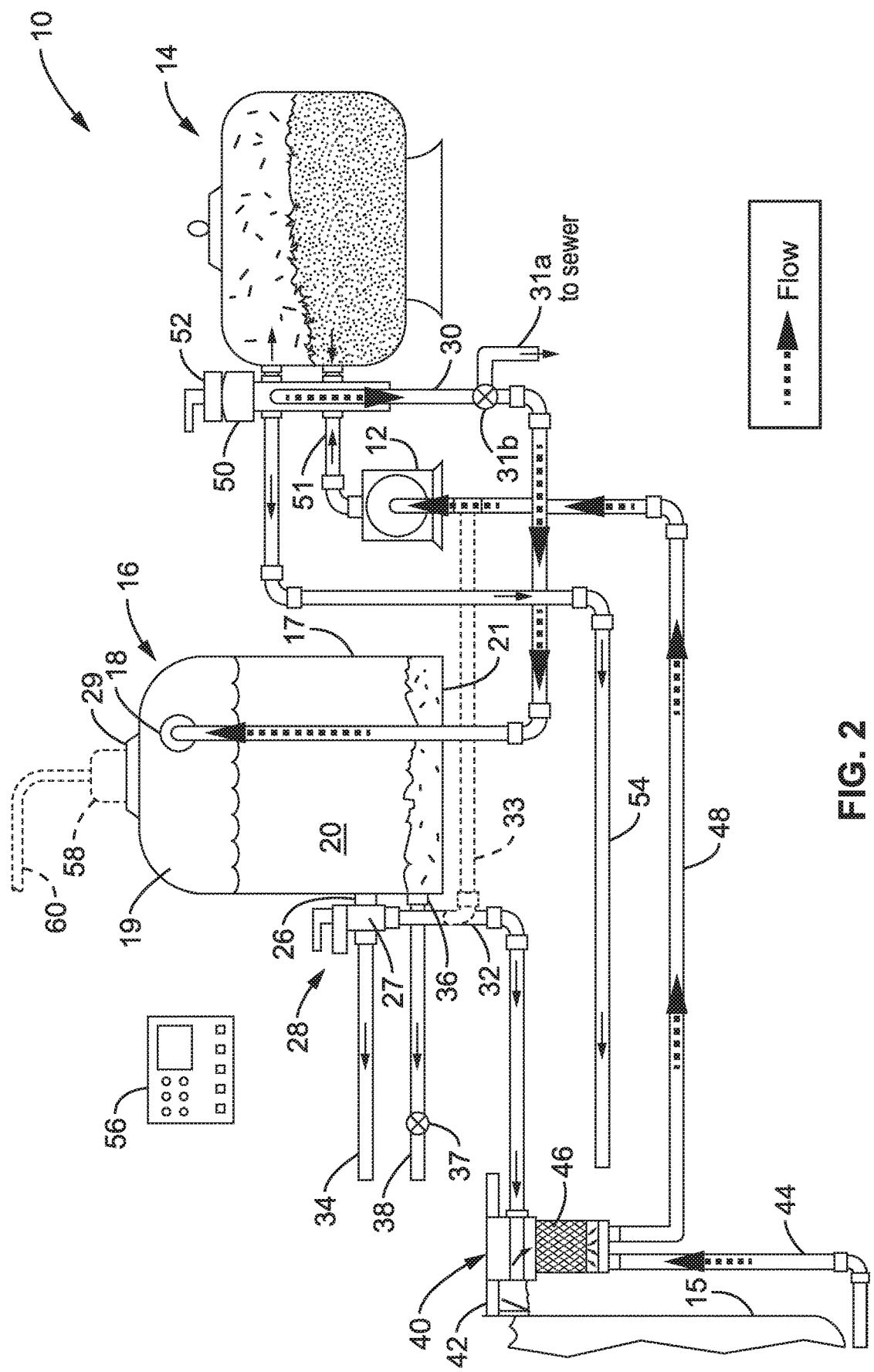
FIG. 2 is a schematic diagram of the backwash pool water recycling system of FIG. 1 depicting flows during a backwash procedure, according to at least one embodiment of the present disclosure.
Figure 3:
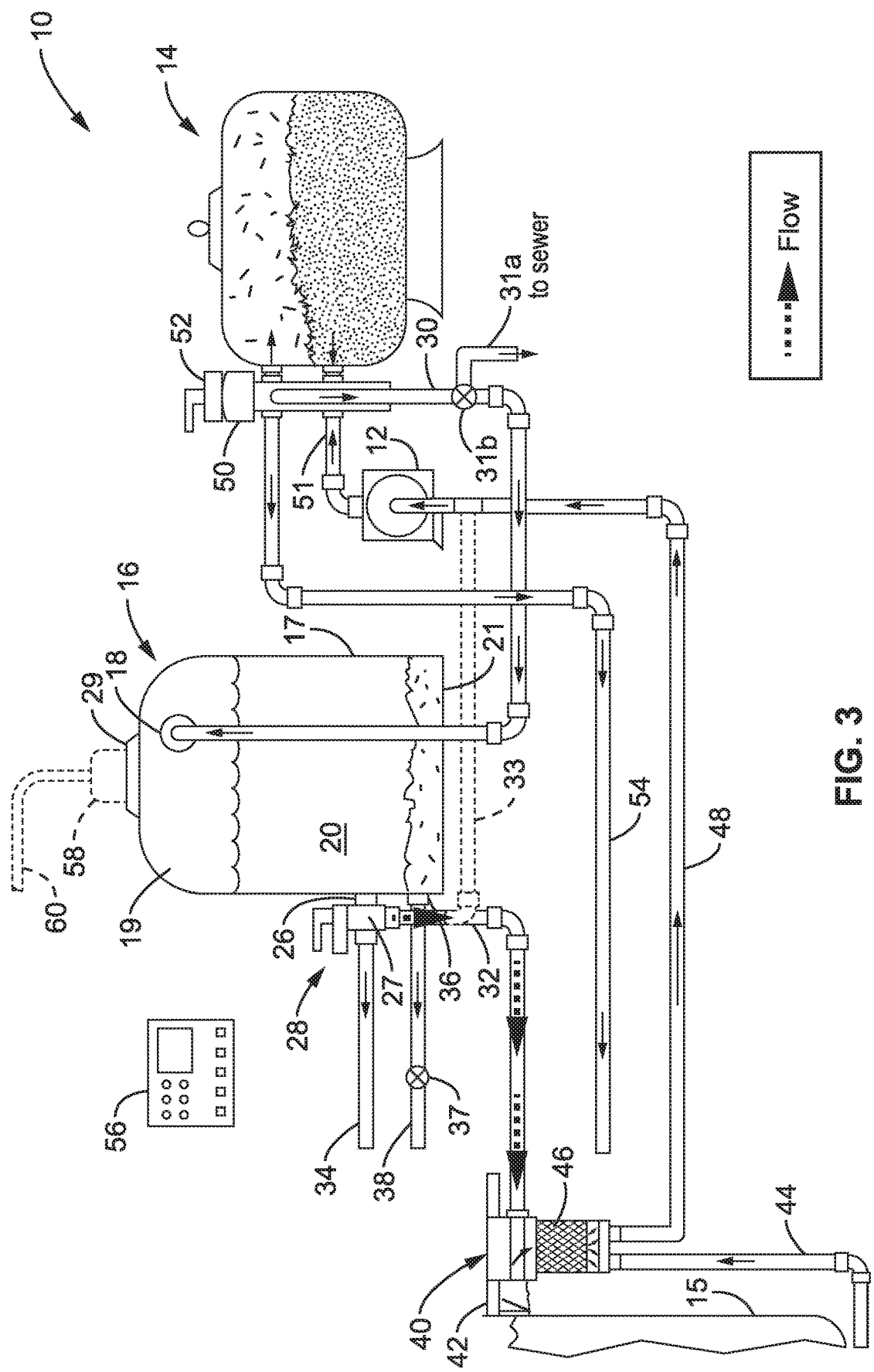
FIG. 3 is a schematic diagram of the backwash pool water recycling system of FIG. 1 depicting flows during a first type of recycling procedure, according to at least one embodiment of the present disclosure.
Figure 4:
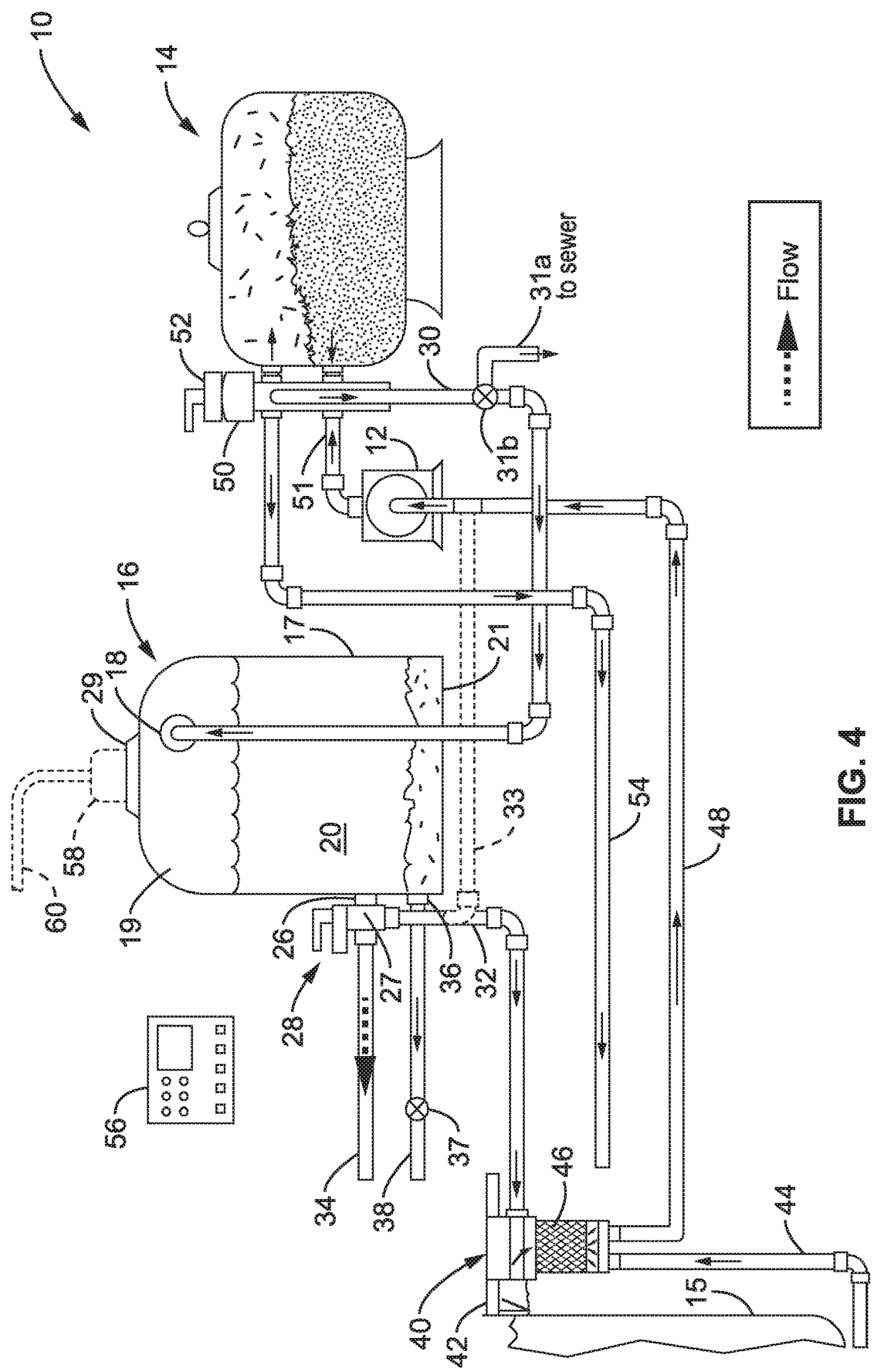
FIG. 4 is a schematic diagram of the backwash pool water recycling system of FIG. 1 depicting flow during a second type of recycling procedure, according to at least one embodiment of the present disclosure.

FIG. 2 through FIG. 4, show operation of the pump system of FIG. 1, with large arrows showing the direction of flows for each example figure.

In FIG. 2 is exemplified the operation of the system when backwash valve 50 is set in the backwash mode instead of the normal filtering mode. It is assumed that valve 27 controlling the output from holding tank 16 is closed so no water is being recycled from the settling tank when the backwash operation commences.

The flows being described below are depicted in the figure as bold flow arrows. To achieve a backwash cleaning operation of filter 14, water is drawn from pool 15 through pool suction line 48 into pump 12 then through line 51 into an open backwash valve 50. This water flow is directed into filter 14 in a reverse (backwash) direction and backwash water output from filter 14 is then directed via valve 50 into backwash discharge line 30 and through inlet 18 into holding (settling) tank 16. The water is prevented from flowing into the pool return line 54 by backwash valve 50, so that water is forced into backwash discharge line 30 where the inline backwash valve 50 permits the water to reverse and continue under force of the pump into holding tank 16 through backwash inlet 18. The backwash operation is continued until the water level in the tank reaches the top water level desired in the tank. The operator can monitor the rising water level by viewing through multiple tank options. It should also be appreciated that holding tank 16 can be configured with a sensor or sensors for detecting the fluid level in the tank so that automation control panel 56 can control the operations.

The backwashed water being held in holding tank 16 may be left to settle for at least 24 hours, or a maximum of 2 to 3 days, so that sediments and other water-borne solids in the backwashed water migrate to the bottom region of the tank over that time to form a sediment phase.

In FIG. 3 is exemplified a recycling procedure to direct recycled water at the end of a settling period from tank 16 back into the pool. This process can be manually activated by the operator, or alternatively using automatic valves under the direction of an electronic control system. It should be appreciated that the entire backwash procedure and the recycling procedure may be advantageously controlled by an automated control center adapted to control the opening and closing of the automated valves.

It should also be appreciated that this flow through tank outlet 26 into the recycled water return line 32 is directed to the pool 15 as seen by the bold flow arrows. The pump can be turned on at this time to draw water via pool suction line 48 through and into pump 12 whose output is returned to the pool via the filter-pool line 54. This operation continues until the water level in holding tank 16 is lowered to the low water level, which is just above the uppermost portion of the tank discharge outlet 26. By this process, a large portion of the back wash water is recovered as clean water returned to the pool, or for other uses, after the settling period.

In FIG. 4 is exemplified an alternative recycling procedure using valve 27 selected to direct the recycled water through line 34 for other uses. The flow path is depicted by bold arrows at the left of the figure from tank 16 via outlet 26 through an opened valve 27 into line 34. This recycled water path also ties back to the processing of rainwater as previously discussed. It should be appreciated that this recycled water flow path also can be utilized in each of the other system embodiments described in the present disclosure.

Figure 5:
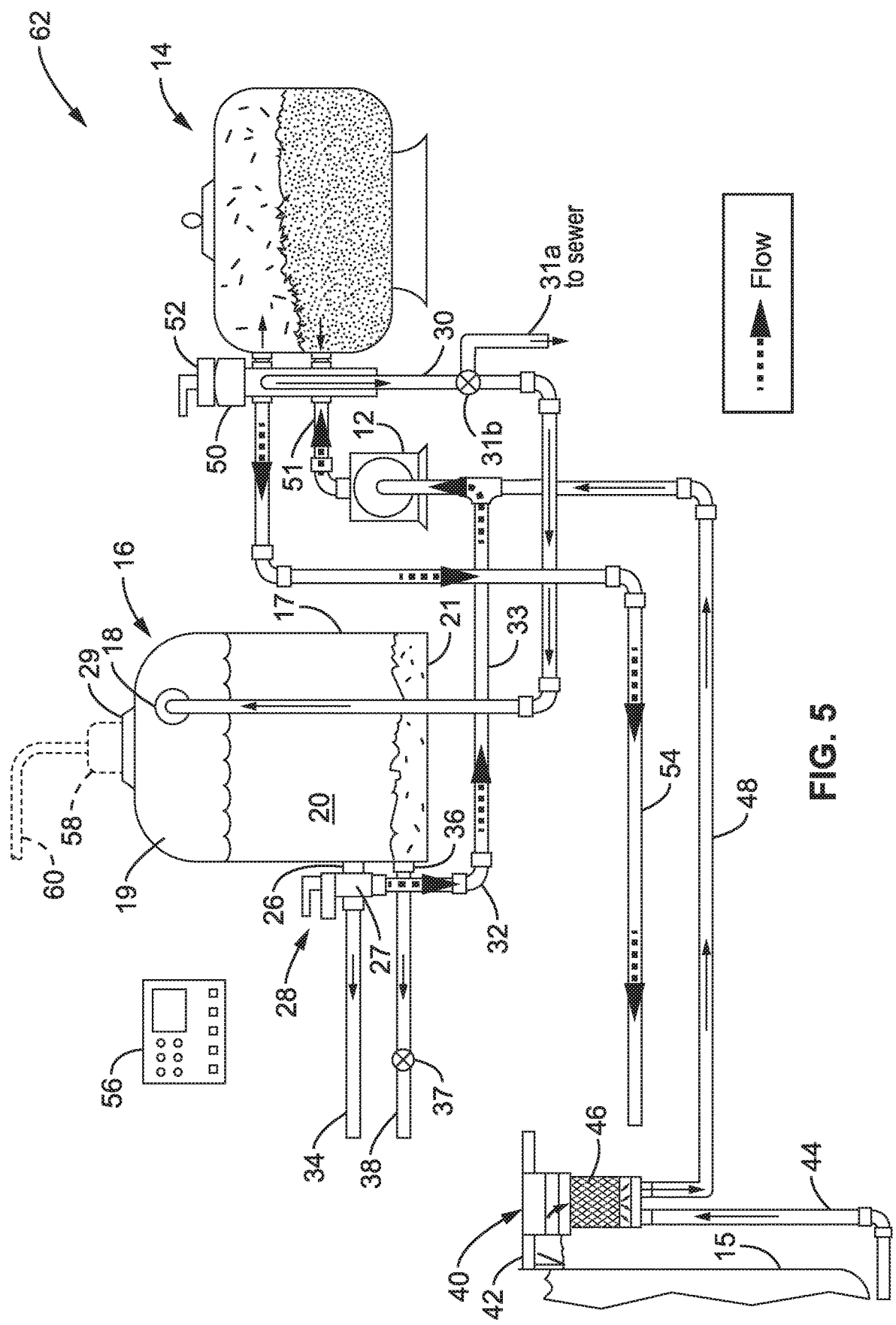
FIG. 5 is a schematic diagram of the backwash pool water recycling system showing a different connection of the recycled water path (above ground) to the pump and filter, according to at least one embodiment of the present disclosure.

FIG. 5 illustrates an example embodiment 62 as a variant of FIG. 1 through FIG. 4, having a slightly different connection of the recycled water path to the pump and filter. In this example the recycled water can be returned via an above ground path, with the flow directions shown by bold arrows in the figure. When valve 27 is selected to direct the recycled water into line 32 it then passes through line 33 and into pump 12 which then filters the water through filter 14 after which this filtered water is output to filtered water return line 54 to the pool.

Figure 6:
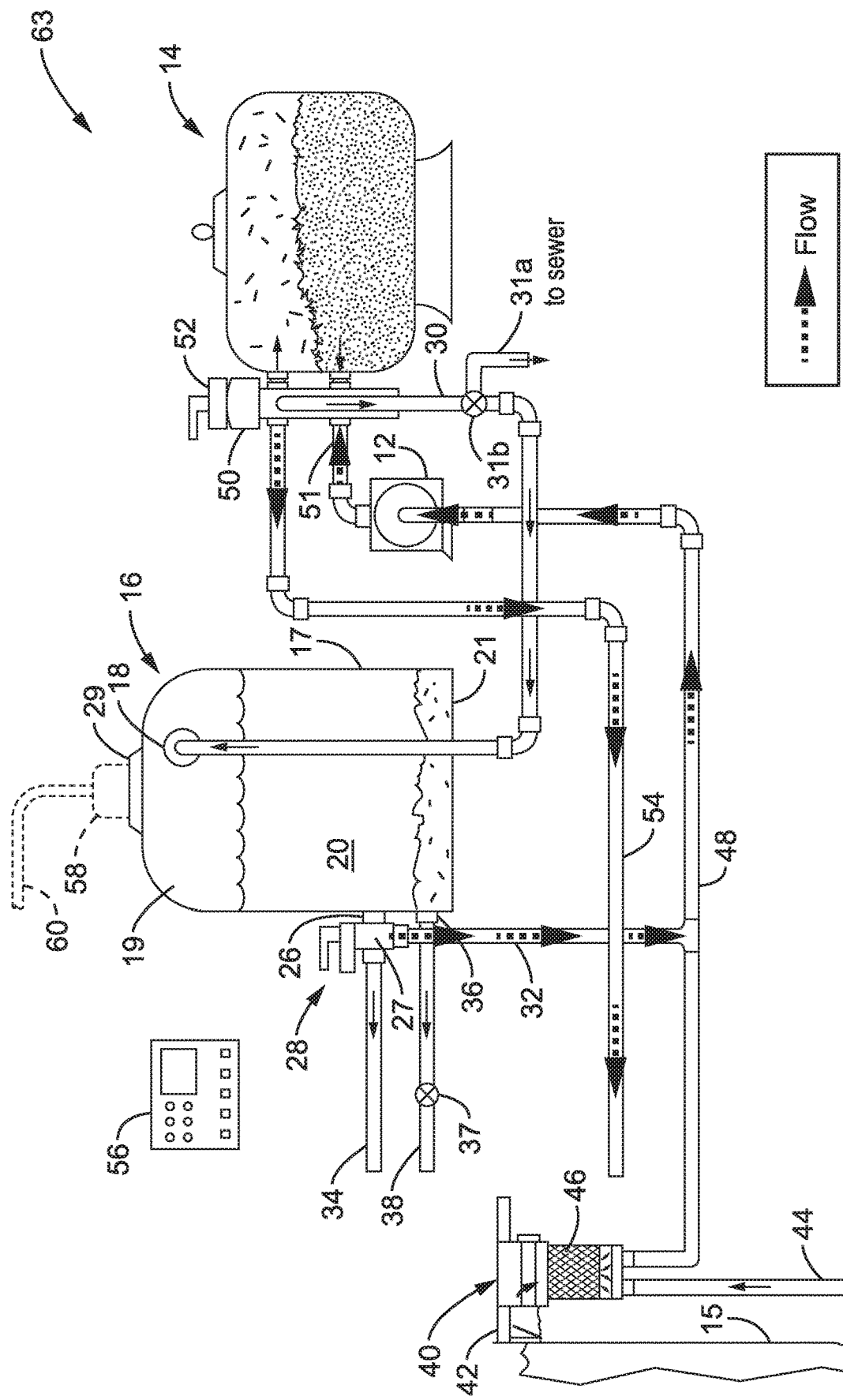
FIG. 6 is a schematic diagram of the backwash pool water recycling system showing another recycled water path to the pump and filter, according to at least one embodiment of the present disclosure.

FIG. 6 illustrates an example embodiment 63 as a variant of FIG. 1 through FIG. 4, having a different recycled water flow path directly into pool intake line 48 with the flow directions shown by bold arrows in the figure. When valve 27 is selected to direct the recycled water into line 32 it then reaches pool intake line 48 which is directed into pump 12 which then filters the water through filter 14 after which this filtered water is output to filtered water return line 54.

Figure 7:
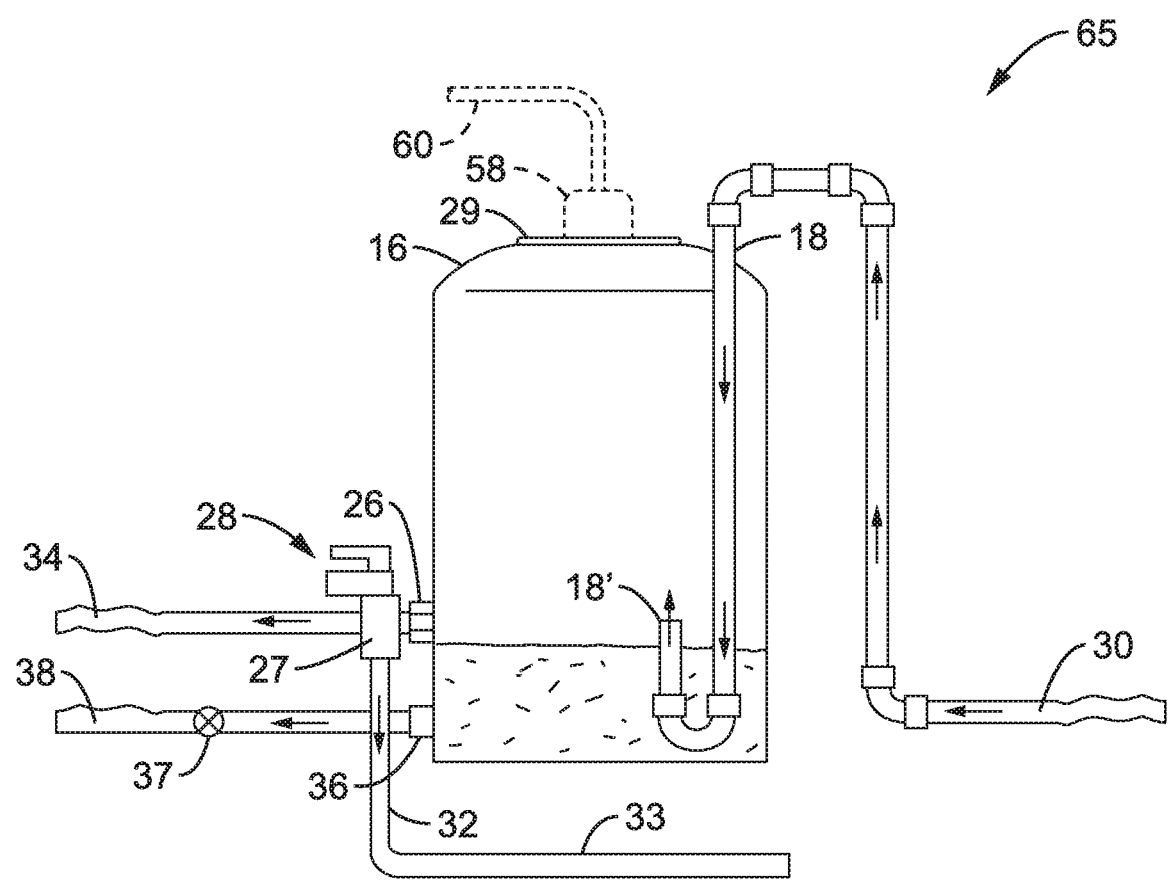
FIG. 7 is a schematic diagram of an alternate backwash line connection into the settling tank, according to at least one embodiment of the present disclosure.

FIG. 7 illustrates an example embodiment 65 of an alternative tank configuration, shown with backwash discharge line 30 entering the top of tank 16 at inlet 18, then routed toward the bottom of the tank and turning up to an outlet (discharge) 18' which is above the sediment region. In at least one preferred embodiment, the discharge 18' within the tank is seen directed upwardly at a location above the sediment zone.

FIG. 8 is another example embodiment 70 of a filter backwash water recycling arrangement with a one-piece filter/settling tank arrangement. In this embodiment settling tank 72 and filter 74 are configured at their base and tops, respectively, for being coupled together. Filter housing 74 is configured to have sufficiently rigid walls and base 76 to withstand the extra weight of settling tank 72 on top of it. By way of example and not limitation, these tanks are coupled together with a ring 78 (e.g., stainless steel) configured with a clamp mechanism (e.g., actuated by a nut-bolt arrangement, lever, or similar force amplifying mechanism) to cinch together the two tanks. This configuration has the advantage of reducing the footprint needed for the filter/settling tank system, and also for improving ease of sediment removal at sediment port 82.

Although the coupled over-under tank/filter configuration described above can be utilized in embodiment 10 of FIG. 1-4, it is shown in this figure utilizing a different arrangement of plumbing. For example in the figure a backwash water input line 92 is depicted with its outlet end facing upwards above the sediment region to reduce sediment disturbance. A clear water output line 75 is directed through a coarse filter 86 before reaching valve 88, whose output 90 can be directed to the reservoir (pool) through pool intake line 102 into pump 12 when it is running, wherein the water is filtered and directed to filtered water return line 100.

The multiway valve arrangement 96 with actuator 94 (e.g., manual or automatic) controls where the output from pump 12 is directed, and can be set for regular filtering or backwash cycles. Inputs and output are seen as input suction 102 and filtered water return output 100. It will be noted that a valve 97 allows the backwash water to be selectively discharged through line 98 to a sewer, instead of being directed through line 92 into holding tank 72.

Filter 74 is seen with a pressure gauge 84, which of course may also be utilized with the embodiments of FIG. 1 through FIG. 4. A sediment removal port 82 is shown near the bottom of settling tank 72. The settling tank is preferably configured with a sloping bottom 73 that directs the sediment toward sediment removal port 82 to facilitate cleaning.

The vent cap 29 of settling (holding) tank 72, can be configured for receiving a rainwater input line 60 and/or filter/diverter 58, wherein it can process rainwater in a similar manner as the embodiment shown in FIG. 1 through FIG. 4.

3. General Scope of Embodiments

The enhancements described in the presented technology can be readily implemented within various pool filter systems. It should also be appreciated that pool filter systems are often controlled by a timer/controller device containing one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of processor devices for carrying out steps involved with controlling pumps, valves and switches associated with pool filtering equipment. The presented technology is non-limiting with regard to memory and computer-readable media, insofar as these are non-transitory, and thus not constituting a transitory electronic signal.

From the description herein, it will be appreciated that the present disclosure encompasses multiple embodiments which include, but are not limited to, the following:

1. A water recycling apparatus for use with a filtration system that includes a filter and a pump, the apparatus comprising: (a) a holding tank configured for receiving backwashed water containing water-borne particles from a filter and pump during a backwash operation; (b) wherein said holding tank has a base, an upper internal space and a lower internal space, and has a sufficient height to permit water-borne particles to settle near the base of said tank over time to obtain a substantially clear water phase above the settled particles; (c) a backwash water inlet into said holding tank which is configured for directing backwash water during a backwash operation into the upper internal space of said holding tank; (d) a waste outlet in said holding tank which is proximal to said base of said tank for the removal of sediment-laden water and settled particulates; (e) a recycling outlet positioned above said waste outlet in said holding tank through which clear water from the clear water phase in said holding tank may be periodically released; (f) a first multi-way valve coupled at the interface of the pump and filter to control the selection of normal filtering or backwash operation; and (g) a second multi-way valve coupled at the recycling outlet of said holding tank for selecting when and where recycled clear water is to be directed, either back to a reservoir being filtered, or redirected for other uses.

2. A water recycling apparatus for use with a filtration system, comprising: (a) a holding tank configured for receiving backwashed water containing water-borne particles from a filter during a backwash operation when a pump and filter are connected to said holding tank for performing filtering of a pool or other reservoir of filtered water, and performing backwash operations to periodically clean the filter; (b) wherein said holding tank has a base, an upper internal space and a lower internal space, and has a sufficient height to permit water-borne particles to settle near a base of said tank over time to obtain a substantially clear water phase above the settled particles; (c) a backwash water inlet into said holding tank which is configured for directing backwash water during a backwash operation into the upper internal space of said holding tank; (f) a vent cap on the top of said holding tank configured for venting and accessing the interior of said holding tank, and further configured for receiving a rainwater inlet and a valve configured for selectively allowing said rainwater to enter said holding tank; (g) a waste outlet in said holding tank which is proximal to said base of said holding tank for the removal of sediment-laden water and settled particulates; (h) a recycling outlet positioned above said waste outlet in said holding tank through which clear water from the clear water phase in said holding tank may be periodically released; (i) a first multi-way valve coupled at the interface of the pump and filter to control the selection of normal filtering or backwash operation; and (j) a second multi-way valve coupled at the recycling outlet of said holding tank for selecting when and where recycled clear water is to be directed, either back to a reservoir being filtered, or redirected for other uses; (k) wherein said apparatus can also collect rainwater, allow it to settle, and then discharge its associated clear water from said holding tank through said recycling outlet either back to the reservoir or redirected for other uses.

3. A water recycling method for a filtration system that includes a filter and a pump, the method comprising: (a) providing a settling tank having a base, a recycling inlet, a recycling outlet, and a waste outlet; (b) directing water from a reservoir through said filter in the reverse direction of normal filtering to perform a backwash operation; (c) directing backwashed water from said filter through a recycling inlet into a settling tank; (d) allowing water-borne sediments to settle on or near the base of the settling tank; (e) directing water above settled sediment from said settling tank through a recycling outlet line back to said reservoir, or selectively to another line for secondary uses; and (f) periodically exhausting said sediment-laden water near said base of said settling tank through the waste outlet.

4. A water recycling apparatus for use with a filtration system that includes a filter and a pump, the apparatus comprising: (a) a water tank configured for receiving backwashed water containing water-borne particles; (b) wherein said tank is configured for communication with said filter and said pump; (c) wherein said tank has a base, an upper internal space and a lower internal space; (d) wherein said tank has a substantial height difference between the upper internal space and the lower internal space, whereby said tank is adapted to permit water-borne particles to settle near the base of said tank over time to obtain a substantially clear water phase above settled particles; (e) wherein said tank has a waste outlet in proximity to said base; (f) wherein said tank has a recycling outlet above said waste outlet through which clear water from the clear water phase in said tank may be periodically released; and (g) wherein said tank has an inlet above said recycling outlet, said inlet for receiving said backwashed water.

5. A water recycling method for a filtration system that includes a filter and a pump, the method comprising: (a) providing a settling tank having a base, a recycling inlet, a recycling outlet, and a waste outlet; (b) directing water from a reservoir through said filter to perform a backwash; (c) directing backwashed water from said filter through a recycling inlet line to the recycling inlet of the settling tank; (d) allowing water-borne sediments to settle on or near the base of the settling tank; (e) directing water above settled sediment from said settling tank through a recycling outlet line to said reservoir, and (f) periodically exhausting said sediment-laden water near said base through the waste outlet.

6. A water recycling apparatus for a filtration system including a filter and pump, said apparatus including a large water tank for receiving backwashed water having water-borne particles, wherein said tank: (a) is in communication with said filter and said pump; (b) has a substantial height difference between the upper internal space and the lower internal space of said tank whereby said tank is adapted to permit water-borne particles to settle near the base of said tank over time to obtain a substantially clear water phase above the settled sediments; (c) has a waste outlet near, in or on said base; (d) has a recycling outlet above said waste outlet through which clear water from the clear water phase may be periodically released; and (e) has an inlet above said recycling outlet, said inlet for receiving said backwashed water.

7. A water recycling tank for a filtration system including a filter and pump, wherein said tank: (a) is in communication with said filter and said pump; (b) has a substantial height difference between the upper internal space and the lower internal space of said tank whereby said tank is adapted to permit water-borne particles to settle near the base of said tank over time to obtain a substantially clear water phase above the settled sediments; (c) has a waste outlet near, in or on said base; (d) has a recycling outlet above said waste outlet and in communication with a water reservoir, and (e) has an inlet for receiving backwashed water from said water reservoir, said inlet located above said recycling outlet, and wherein said clear water phase can be periodically released through said recycling outlet to said water reservoir to replenish water level in said water reservoir.

8. A water recycling method for a filtration system that includes a filter, pump, and settling tank, said method comprising: (a) directing water from a reservoir through said filter to perform a backwash; (b) directing the backwashed water from said filter through a recycling inlet line to said tank; (c) allowing water-borne sediments to settle on or near the base of the tank; (d) directing water above said settled sediment from said tank through a recycling outlet line to said reservoir, and (e) periodically exhausting said sediment-laden water near said base through a waste outlet.

9. A water recycling apparatus for a filtration system including a filter and pump, said apparatus including a large water tank: (a) in communication with said filter and said pump; (b) that has a substantial height difference between the upper internal space and the lower internal space of said tank whereby said tank is adapted to permit water-borne particles to settle near the base of said tank over time to obtain a substantially clear water phase above the settled sediments; (c) has a waste outlet near, in or on said base; (d) has a recycling outlet above said waste outlet and in communication with a water reservoir, and (e) has an inlet for receiving backwashed water from said water reservoir, said inlet located above said recycling outlet, wherein said clear water phase can be periodically released through said recycling outlet to said water reservoir to replenish the water level in said water reservoir.

10. A water recycling tank for a filtration system including a filter and pump, wherein said tank: (a) is in communication with said filter and said pump; (b) has a substantial height difference between the upper internal space and the lower internal space of said tank whereby said tank is adapted to permit water-borne particles to settle near the base of said tank over time to obtain a substantially clear water phase above the settled sediments; (c) has a waste outlet near, in or on said base; (d) has a recycling outlet above said waste outlet and in communication with a water reservoir, and (e) has an inlet for receiving backwashed water from said water reservoir, said inlet located above said recycling outlet, and wherein said clear water phase can be periodically released through said recycling outlet to said water reservoir to replenish water level in said water reservoir.

11. The apparatus, method or tank of any preceding embodiment, wherein said first multi-way valve, or said second multi-way valve, or a combination of said first and multi-way valves are electronic valves configured for being controlled by an automation control device.

12. The apparatus, method or tank of any preceding embodiment, wherein said holding tank has an internal volume and is adapted to permit water-borne particles to settle in the lower 20% of said holding tank's internal volume.

13. The apparatus, method or tank of any preceding embodiment, wherein said backwash water inlet is positioned above said lower 20% of said holding tank's internal volume.

14. The apparatus, method or tank of any preceding embodiment, wherein said apparatus is configured for periodically releasing the clear water phase from said holding tank through said recycling outlet, through the filter to the water reservoir to replenish water level in the water reservoir, or to direct said clear water to an alternate use.

15. The apparatus, method or tank of any preceding embodiment, wherein the base of said holding tank is internally shaped to direct particles down to the position of said waste outlet.

16. The apparatus, method or tank of any preceding embodiment, further comprising a vent cap on the top of said holding tank configured for venting and accessing the interior of said holding tank.

17. The apparatus, method or tank of any preceding embodiment, wherein said vent cap is configured for receiving a rainwater inlet and valve through which rainwater can be selectively allowed to enter said holding tank; wherein said apparatus can collect said rainwater, allow it to settle, and then discharge clear water from said holding tank through said recycling outlet either back to the water reservoir or redirected for other uses.

18. The apparatus, method or tank of any preceding embodiment, wherein said rainwater inlet and valve further comprises a filter and/or particle diverter to prevent non-particulate material from entering said holding tank.

19. The apparatus, method or tank of any preceding embodiment, further comprising an automation control device for controlling the operation of said first and/or second multi-way valves in automating backwash operations of said apparatus.

20. The apparatus, method or tank of any preceding embodiment, wherein said holding tank is configured for secure attachment on top of said filter to simplify dispensing of clearwater from said recycling outlet of said holding tanks, and removal of sediment-laden water and settled particulates from said waste outlet.

21. The apparatus, method or tank of any preceding embodiment, wherein said rainwater inlet and valve further comprises a filter and/or particle diverter to prevent non-particulate material from entering said holding tank.

22. The apparatus, method or tank of any preceding embodiment, further comprising: (a) an inline valve configured for placement between the tank and the filter; and (b) an automation control device configured for controlling flow through said inline valve.

23. The apparatus, method or tank of any preceding embodiment, (a) wherein the recycling outlet is configured for communication with a water reservoir; (b) wherein said inlet is configured for receiving backwashed water from said water reservoir; and (c) wherein said clear water phase can be periodically released through said recycling outlet to said water reservoir to replenish water level in said water reservoir.

24. The apparatus, method or tank of any preceding embodiment, wherein said sediment-laden water is reused for horticultural purposes.

Orientation terms used in the specification and claims such as vertical, horizontal, top, bottom, upper and lower are to be interpreted as relational and are based on the premise that the component, item, article, apparatus, device or instrument will usually be considered in a particular orientation.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A water recycling apparatus for use with a filtration system that includes a filter and a pump, the apparatus comprising:
    (a) a holding tank configured for receiving backwashed water containing water-borne particles from the filter and the pump during a backwash operation;
    (b) wherein said holding tank has a base, an upper internal space and a lower internal space, and has a sufficient height to permit water-borne particles to settle near the base of said holding tank over time to obtain a substantially clear water phase above the settled particles;
    (c) a backwash water inlet into said holding tank which is configured for directing backwash water during the backwash operation into the upper internal space of said holding tank;
    (d) a waste outlet in said holding tank which is proximal to said base of said holding tank for the removal of sediment-laden water and settled particulates;

(e) a recycling outlet positioned above said waste outlet in said holding tank through which clear water from the clear water phase in said holding tank may be periodically released;

(f) a first multi-way valve coupled at an interface of the pump and filter to control selection of normal filtering or backwash operation; and (g) a second multi-way valve coupled at the recycling outlet of said holding tank for selecting when and where recycled clear water is to be directed, either back to a reservoir being filtered, or redirected for other uses.

2. The apparatus of claim 1, wherein said first multi-way valve, or said second multi-way valve, or a combination of said first and second multi-way valves are electronic valves configured for being controlled by an automation control device.

3. The apparatus of claim 1, wherein said holding tank has an internal volume and is adapted to permit water-borne particles to settle in the lower 20% of said holding tank's internal volume.

4. The apparatus of claim 3, wherein said backwash water inlet is positioned above said lower 20% of said holding tank's internal volume.

5. The apparatus of claim 1, wherein said apparatus is configured for periodically releasing the clear water phase from said holding tank through said recycling outlet, through the filter to the reservoir to replenish water level in the reservoir, or to direct said clear water to an alternate use.

6. The apparatus of claim 1, wherein the base of said holding tank is internally shaped to direct particles down to the position of said waste outlet.

7. The apparatus of claim 1, further comprising a vent cap on the top of said holding tank configured for venting and accessing the interior of said holding tank.

8. The apparatus of claim 7:
wherein said vent cap is configured for receiving a rainwater inlet and valve through which rainwater can be selectively allowed to enter said holding tank;
wherein said apparatus can collect said rainwater, allow it to settle, and then discharge clear water from said holding tank through said recycling outlet either back to the reservoir or redirected for other uses.

9. The apparatus of claim 8, wherein said rainwater inlet and valve further comprises a filter and/or particle diverter to prevent non-particulate material from entering said holding tank.

10. The apparatus of claim 1, further comprising an automation control device for controlling the operation of said first and/or second multi-way valves in automating backwash operations of said apparatus.

11. The apparatus of claim 1, wherein said holding tank is configured for secure attachment on top of the filter to simplify dispensing of clearwater from said recycling outlet of said holding tank, and removal of sediment-laden water and settled particulates from said waste outlet.

12. A water recycling method for a filtration system that includes a filter and a pump, the method comprising:
(a) providing the water recycling apparatus of claim 1;
(b) directing water from the reservoir through said filter in a reverse direction of normal filtering to perform the backwash operation;
(c) directing backwashed water from said filter through a recycling inlet into the holding tank;
(d) allowing sediment in said sediment-laden water to settle on or near the base of the holding tank;

(e) directing water above settled sediment from said holding tank through the recycling outlet line back to said reservoir, or selectively to another line for secondary uses; and (f) periodically exhausting said sediment-laden water near said base of said holding tank through the waste outlet.

13. A water recycling apparatus for use with a filtration system, comprising:

(a) a holding tank configured for receiving backwashed water containing water-borne particles from a filter during a backwash operation when a pump and the filter are connected to said holding tank for performing filtering of a pool or other reservoir of filtered water, and performing backwash operations to periodically clean the filter;

(b) wherein said holding tank has a base, an upper internal space and a lower internal space, and has a sufficient height to permit water-borne particles to settle near the base of said holding tank over time to obtain a substantially clear water phase above the settled particles;

(c) a backwash water inlet into said holding tank which is configured for directing backwash water during a backwash operation into the upper internal space of said holding tank;

(f) a vent cap on the top of said holding tank configured for venting and accessing the interior of said holding tank, and further configured for receiving a rainwater inlet and a valve configured for selectively allowing said rainwater to enter said holding tank;

(g) a waste outlet in said holding tank which is proximal to said base of said holding tank for removal of sediment-laden water and settled particulates;

(h) a recycling outlet positioned above said waste outlet in said holding tank through which clear water from the clear water phase in said holding tank may be periodically released;

(i) a first multi-way valve coupled at an interface of the pump and filter to control a selection of normal filtering or backwash operation; and (j) a second multi-way valve coupled at the recycling outlet of said holding tank for selecting when and where recycled clear water is to be directed, either back to a reservoir being filtered, or redirected for other uses;

(k) wherein said apparatus can also collect rainwater, allow it to settle, and then discharge its associated clear water from said holding tank through said recycling outlet either back to the reservoir or redirected for other uses.

14. The apparatus of claim 13, wherein said rainwater inlet and valve further comprises a filter and/or particle diverter to prevent non-particulate material from entering said holding tank.

15. The apparatus of claim 13, wherein said first multi-way valve, or said second multi-way valve, or a combination of said first and second multi-way valves are electronic valves configured for being controlled by an automation control device.

16. The apparatus of claim 13:
wherein said holding tank has an internal volume and is adapted to permit water-borne particles to settle in a lower 20% of said holding tank's internal volume; and
wherein said backwash water inlet is positioned above said lower 20% of said holding tank's internal volume.

17. The apparatus of claim 13, wherein said apparatus is configured for periodically releasing the clear water phase through said recycling outlet to the reservoir to replenish a water level in said water reservoir, or to direct said clear water to an alternate use.

18. The apparatus of claim 13, wherein the base of said holding tank is internally shaped to direct particles down towards said waste outlet.

19. The apparatus of claim 13, further comprising an automation control device for controlling the operation of said first and/or second multi-way valves in automating backwash and rainwater reuse operations.

20. The apparatus of claim 13, wherein said holding tank is configured for secure attachment on top of the filter to simplify dispensing of clearwater from said recycling outlet, and sediment-laden water and settled particulates from said waste outlet.

21. A water recycling method for a filtration system that includes a filter and a pump, the method comprising:
  (a) providing the water recycling apparatus of claim 13;
  (b) directing water from the reservoir through said filter in a reverse direction of normal filtering to perform the backwash operation;
  (c) directing backwashed water from said filter through a recycling inlet into the holding tank;
  (d) allowing sediment in said sediment-laden water to settle on or near the base of the holding tank;
  (e) directing water above settled sediment from said holding tank through the recycling outlet line back to said reservoir, or selectively to another line for secondary uses; and
  (f) periodically exhausting said sediment-laden water near said base of said holding tank through the waste outlet.

\* \* \* \* \*